United States Patent
Akishita et al.

(10) Patent No.: US 12,415,537 B2
(45) Date of Patent: Sep. 16, 2025

(54) INFORMATION PROCESSING DEVICE

(71) Applicant: TOYOTA JIDOSHA KABUSHIKI KAISHA, Toyota (JP)

(72) Inventors: Yosuke Akishita, Tokyo (JP); Hiroyuki Bandai, Nagakute (JP); Takurou Sakai, Tokyo (JP)

(73) Assignee: TOYOTA JIDOSHA KABUSHIKI KAISHA, Toyoto (JP)

( * ) Notice: Subject to any disclaimer, the term of this patent is extended or adjusted under 35 U.S.C. 154(b) by 21 days.

(21) Appl. No.: 18/636,953

(22) Filed: Apr. 16, 2024

(65) Prior Publication Data
US 2024/0400080 A1 Dec. 5, 2024

(30) Foreign Application Priority Data
May 31, 2023 (JP) .................. 2023-090345

(51) Int. Cl.
*B60W 50/14* (2020.01)
*B60W 50/00* (2006.01)

(52) U.S. Cl.
CPC ..... *B60W 50/14* (2013.01); *B60W 2050/0083* (2013.01); *B60W 2050/146* (2013.01); *B60W 2530/209* (2020.02); *B60W 2556/45* (2020.02)

(58) Field of Classification Search
None
See application file for complete search history.

(56) References Cited

U.S. PATENT DOCUMENTS

| | | | |
|---|---|---|---|
| 2007/0225180 A1 | 9/2007 | Tamoto | |
| 2008/0120175 A1 | 5/2008 | Doering | |
| 2016/0222867 A1* | 8/2016 | Lee | B60K 11/085 |
| 2018/0273870 A1* | 9/2018 | Burns, III | C10M 101/02 |
| 2023/0174695 A1* | 6/2023 | Schöller | C10M 145/14 |
| | | | 508/469 |

FOREIGN PATENT DOCUMENTS

| | | |
|---|---|---|
| JP | 2005-344017 A | 12/2005 |
| JP | 2008-129603 A | 6/2008 |
| JP | 2010-188823 A | 9/2010 |
| JP | 6141993 B2 | 5/2017 |

* cited by examiner

*Primary Examiner* — Van T Trieu
(74) *Attorney, Agent, or Firm* — Sughrue Mion, PLLC

(57) ABSTRACT

The information processing device includes a control unit that specifies, for each preset setting area, a setting condition for improving the fuel efficiency of the vehicle by using the low-viscosity oil based on the data of the plurality of vehicles. When the data of the vehicle that does not use the low viscosity oil satisfies the setting condition in the setting area, the control unit executes a notification process for recommending the user of the vehicle that does not use the low viscosity oil to use the low viscosity oil.

5 Claims, 3 Drawing Sheets

FIG. 3

| SETTING AREA | SETTING CONDITIONS | VEHICLE ENVIRONMENTAL CONDITIONS | RUNNING CONDITIONS OF THE VEHICLE | FUEL EFFICIENCY DIFFERENCE |
|---|---|---|---|---|
| | | AMBIENT TEMPERATURE OF THE VEHICLE (TEMPERATURE RANGE) | VEHICLE SPEED (SPEED RANGE) | |
| aaa | CONDITIONS A | TEMPERATURE Ta1~Ta2 | SPEED Ra1~Ra2 | ... |
| bbb | CONDITIONS B | TEMPERATURE Tb1~Tb2 | SPEED Rb1~Rb2 | ... |

INFORMATION PROCESSING DEVICE

CROSS-REFERENCE TO RELATED APPLICATION

This application claims priority to Japanese Patent Application No. 2023-090345 filed on May 31, 2023, incorporated herein by reference in its entirety.

BACKGROUND

1. Technical Field

The present disclosure relates to an information processing device.

2. Description of Related Art

Conventionally, low-viscosity oils that can be used as engine oils have been known (for example, Japanese Unexamined Patent Application Publication No. 2005-344017 (JP 2005-344017 A)).

SUMMARY

When the use of low-viscosity oil improves the fuel efficiency of a vehicle, it is useful to recommend a user of the vehicle to use the low-viscosity oil.

In view of the foregoing, it is an object of the present disclosure to recommend a user of a vehicle whose fuel efficiency is improved by the use of low-viscosity oil to use the low-viscosity oil.

An aspect of the present disclosure provides an information processing device including
- a control unit that specifies a setting condition for improving fuel efficiency of a vehicle by using low-viscosity oil based on data on a plurality of vehicles for each setting area set in advance.
- The control unit is configured to
- execute a notification process to recommend a user of a vehicle in which the low-viscosity oil is not used to use the low-viscosity oil when data on vehicles in which the low-viscosity oil is not used meet the setting condition in the setting area.

According to an aspect of the present disclosure, it is possible to recommend a user of a vehicle whose fuel efficiency is improved by the use of low-viscosity oil to use the low-viscosity oil.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram illustrating exemplary setting conditions.

DETAILED DESCRIPTION OF EMBODIMENTS

Hereinafter, an embodiment of the present disclosure will be described below with reference to the drawings.

Figure 1:
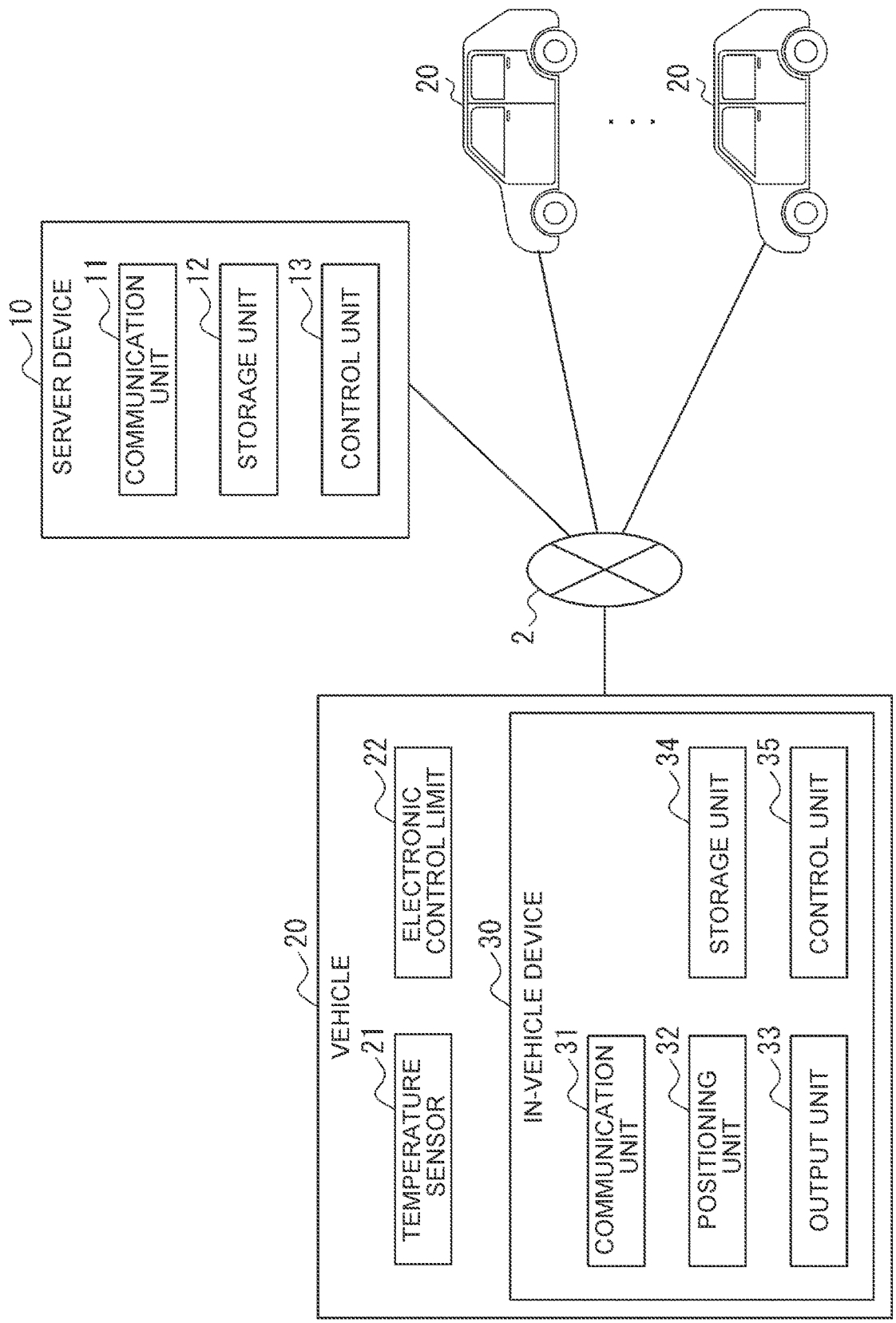
FIG. 1 is a diagram illustrating a schematic configuration of a system according to an embodiment of the present disclosure.

As illustrated in FIG. 1, the system 1 according to the present embodiment includes a server device 10 and a plurality of vehicles 20. The server device 10 and the vehicle 20 can communicate with each other via the network 2. The network 2 may be any network including a mobile communication network, the Internet, and the like.

The server device 10 is an information processing device. The server device 10 is, for example, a dedicated computer configured to function as a server, a general-purpose personal computer, a cloud computing system, or the like.

The server device 10 is managed by, for example, a vendor of engine oil. The server device 10 has information on the type of engine oil used in each of the plurality of vehicles 20. When low viscosity oil is used for the vehicle 20, the fuel efficiency of the vehicle 20 may be improved. When the fuel efficiency of the vehicle 20 is improved, the vehicle 20 travels a larger distance with a smaller amount of fuel.

Here, the degree of improvement in the fuel efficiency of the vehicle 20 due to the use of the low-viscosity oil varies from region to region. For example, there are many traffic lights in urban areas compared to suburban areas. Therefore, in the urban area, the frequency of the temporary stop of the vehicle 20 is higher than in the suburban area. When the frequency of the pause of the vehicle 20 increases, the number of times the engine of the vehicle 20 is started increases. The resistance of the engine of the vehicle 20 is particularly high when the engine is started. When the resistance applied to the engine of the vehicle 20 increases, the fuel efficiency of the vehicle 20 deteriorates. When the low viscosity oil is used, the resistance applied to the engine at the time of starting the vehicle 20 can be reduced. That is, in a region including a larger number of urban areas, the degree of improvement in fuel efficiency of the vehicle 20 due to the use of the low-viscosity oil is greater than in the other regions.

Further, the degree to which the fuel efficiency of the vehicle 20 is improved by the use of the low viscosity oil depends on at least one of the environmental conditions and the driving conditions of the vehicle 20. For example, when the vehicle speed of the vehicle 20 changes, the engine speed changes. When the rotational speed of the engine changes, the degree to which the fuel efficiency of the vehicle 20 improves due to the use of the low-viscosity oil also changes.

Therefore, the server device 10 specifies, for each of the plurality of setting areas, a setting condition for improving the fuel efficiency of the vehicle 20 by using the low-viscosity oil based on the data of the plurality of vehicles 20. The set area is set in advance. The setting area may be set by a prefecture or may be set by a local division such as Tohoku or Kanto. Further, as will be described later, the server device 10 specifies the setting condition by specifying the environment information and the traveling information of the vehicle 20 in which the fuel efficiency of the vehicle 20 is improved by the use of the low viscosity oil. Further, in the setting area, when the data of the vehicle 20 that does not use the low-viscosity oil satisfies the setting condition, the server device 10 executes a notification process for recommending the user of the vehicle 20 that does not use the low-viscosity oil to use the low-viscosity oil. By specifying the setting condition for improving the fuel efficiency of the vehicle 20 in each setting area as described above, it is possible to more accurately recommend the use of the low viscosity oil to the user of the vehicle 20 who does not use the low viscosity oil in the setting area.

The server device 10 includes a communication unit 11, a storage unit 12, and a control unit 13.

The communication unit 11 is configured to include at least one communication module that can be connected to the network 2. The communication module is, for example, a communication module compliant with a standard such as a wired Local Area Network (LAN) or a wireless LAN. The communication unit 11 is connected to the network 2 with the communication module via a wired LAN or a wireless LAN.

The storage unit 12 is configured to include at least one semiconductor memory, at least one magnetic memory, at least one optical memory, or a combination of at least two of them. The storage unit 12 may function as a main storage device, an auxiliary storage device, or a cache memory. The storage unit 12 stores data used for the operation of the server device 10 and data obtained by the operation of the server device 10. For example, the storage unit 12 stores information on the type of engine oil used in each of the plurality of vehicles 20.

The control unit 13 is configured to include at least one processor, at least one dedicated circuit, or a combination thereof. The processor may be, for example, a general-purpose processor such as Central Processing Unit (CPU) or Graphics Processing Unit (GPU) or a special-purpose processor specialized for a particular process. The control unit 13 executes processing related to the operation of the server device 10 while controlling each unit of the server device 10.

The vehicle 20 is, for example, an automobile such as a gasoline-powered vehicle or a hybrid electric vehicle (HEV). However, the vehicle 20 is not limited thereto. Vehicle 20 may be any type of automobile provided with an engine.

The vehicle 20 includes a temperature sensor 21, an electronic control unit 22, and an in-vehicle device 30.

The temperature sensor 21 is capable of detecting the ambient temperature of the vehicle 20. The ambient temperature of the vehicle 20 is also referred to as the outside air temperature of the vehicle 20. At least a portion of the temperature sensor 21 may be disposed outside the vehicle 20.

The electronic control unit 22 is an Electronic Control Unit (ECU of the vehicles 20). The electronic control unit 22 controls various functions of the vehicle 20.

The in-vehicle device 30 is an information processing device. The in-vehicle device 30 is, for example, a navigation device. The in-vehicle device 30 includes a communication unit 31, a positioning unit 32, an output unit 33, a storage unit 34, and a control unit 35.

The communication unit 31 is configured to include at least one communication module that can be connected to the network 2. The communication module is a communication module compliant with a mobile communication standard such as Long Term Evolution (LTE), 4th Generation (4G), or 5th Generation (5G), for example.

The communication unit 31 may include at least one communication module capable of communicating with the temperature sensor 21 and the electronic control unit 22. The communication module is, for example, a communication module corresponding to a standard of an in-vehicle network or a dedicated line.

The positioning unit 32 can acquire position information of the vehicle 20 on which the in-vehicle device 30 is mounted. The positioning unit 32 is configured to include at least one receiving module corresponding to the satellite positioning system. The reception module is, for example, a reception module corresponding to Global Positioning System (GPS).

The output unit 33 can output data. The output unit 33 includes at least one output interface capable of outputting data. The output interface is, for example, a display or a speaker. The display is, for example, a Liquid Crystal Display (LCD) or an organic Electro Luminescence (EL) display.

The configuration of the storage unit 34 may be the same as or similar to the configuration of the storage unit 12. The storage unit 34 stores data used for the operation of the in-vehicle device 30 and data obtained by the operation of the in-vehicle device 30.

The configuration of the control unit 35 may be the same as or similar to that of the control unit 13. The control unit 35 executes processing related to the operation of the in-vehicle device 30 while controlling each unit of the in-vehicle device 30.

System Operation

Figure 2:
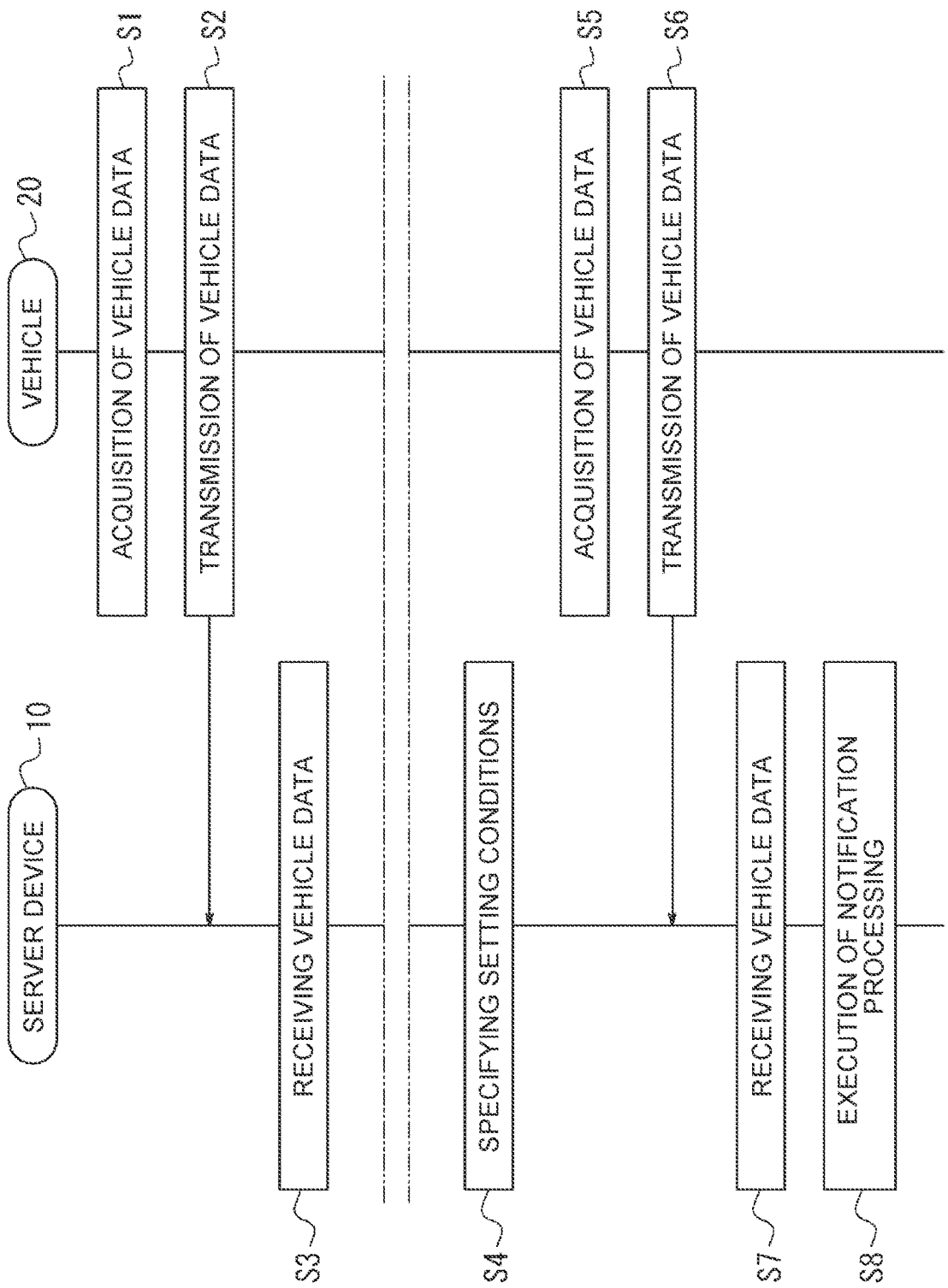
FIG. 2 is a sequence diagram illustrating an exemplary operation of the system shown in FIG. 1.

FIG. 2 is a sequence diagram illustrating an operation example of the system 1 illustrated in FIG. 1.

Processing of S1 and S2 may be performed by in-vehicle device 30 of any vehicle 20 of the plurality of vehicles 20 included in the system 1.

In S1 process, in the in-vehicle device 30, the control unit 35 acquires the data of the vehicle 20. The data of the vehicle 20 may be any data as long as it is data related to the fuel efficiency of the vehicle 20. In the present embodiment, the data of the vehicle 20 includes environmental data and traveling data of the vehicle 20.

The environment data of the vehicle 20 includes, for example, time-series data of the ambient temperature of the vehicle 20. For example, the control unit 35 acquires time-series data of the ambient temperature of the vehicle 20 by sequentially receiving the data of the ambient temperature of the vehicle 20 detected by the temperature sensor 21 by the communication unit 31.

The travel data of the vehicle 20 includes, for example, time-series data of the position of the vehicle 20, time-series data of the speed of the vehicle 20, trip time data, and fuel consumption data for each trip time. In addition to or in place of these data, the travel data of the vehicle 20 may include historical usage data of the heating device, time series data of the temperature of the coolant of the engine, and time series data of the rotational speed of the engine. The temperature of the coolant of the engine is the so-called engine water temperature. The trip time is a time during which the vehicle 20 travels from the departure point to the destination. The fuel efficiency of the vehicle 20 is the travel distance of the vehicle 20 per unit capacity of the fuel. For example, the control unit 35 acquires time-series data of the position of the vehicle 20 by sequentially acquiring the position information of the vehicle 20 from the positioning unit 32. The control unit 35 acquires time-series data of the speed of the vehicle 20, data of the trip time, and data of the fuel consumption per trip time by communicating with the electronic control unit 22 via the communication unit 31, for example. The control unit 35 acquires, for example, time-series data of the use history of the heating device, time-series data of the temperature of the coolant of the engine, and time-series data of the rotational speed of the engine by communicating with the electronic control unit 22 via the communication unit 31.

In S2 process, the control unit 35 transmits the data of the vehicle 20 to the server device 10 via the network 2 by the communication unit 31.

In S3 process, in the server device 10, the control unit 13 receives data of the vehicle 20 from the vehicle 20 via the network 2 by the communication unit 11. The control unit 13 stores the received data of the vehicle 20 in the storage unit 12.

The process from S1 to S3 may be repeatedly executed for a predetermined time. The predetermined period may be set based on the traveling frequency of the plurality of vehicles 20 included in the system 1. When the processes from S1 to S3 are repeatedly executed, the data of the plurality of vehicles 20 is accumulated in the storage unit 12 of the server device 10.

In S4 process, in the server device 10, the control unit 13 acquires the data of the vehicles 20 accumulated in the storage unit 12. Based on the acquired data of the vehicle 20, the control unit 13 specifies a setting condition for improving the fuel efficiency of the vehicle 20 by using the low-viscosity oil for each set area. An example of this processing will be described below.

The control unit 13 calculates the fuel efficiency difference in the vehicle 20 by subtracting the fuel efficiency of the vehicle 20 when the high-viscosity oil is used from the fuel efficiency of the vehicle 20 when the low-viscosity oil is used for each set area. Here, the high viscosity oil may be an engine oil having an arbitrary viscosity as long as it has a viscosity higher than that of the low viscosity oil. The high viscosity oil may be selected depending on the low viscosity oil recommended for use. For example, it is assumed that 0W-8 engine oil in the viscosity section of Society of Automotive engineers (SAE) is the low viscosity oil recommended for use. In this case, the control unit 13 may calculate the fuel efficiency difference in the vehicle 20 using 0W-16 engine oil as the high viscosity oil, or may calculate the fuel efficiency difference in the vehicle 20 using 0W-20 engine oil as the high viscosity oil. The control unit 13 may distinguish the vehicle 20 using the low-viscosity oil from the vehicle 20 using the high-viscosity oil based on the information on the type of the engine oil used for each of the plurality of vehicles 20 stored in the storage unit 12. In addition, the control unit 13 may specify the vehicle 20 traveling in the set area based on the time-series data of the position of the vehicle 20 included in the traveling data of the vehicle 20.

The greater the difference in fuel efficiency in the vehicle 20, the greater the degree of improvement in fuel efficiency of the vehicle 20 due to the use of low viscosity oil.

Therefore, the control unit 13 specifies the environmental condition and the traveling condition of the vehicle 20 in which the difference in fuel consumption in the vehicle 20 increases, thereby specifying the setting condition in which the fuel consumption of the vehicle 20 is improved by using the low-viscosity oil. For example, the control unit 13 divides the environmental data and the traveling data of the vehicle 20 accumulated in the storage unit 12 into data groups. The control unit 13 calculates the fuel efficiency difference in each data group based on the information on the type of the engine oil stored in the storage unit 12, thereby specifying the environmental condition and the traveling condition of the vehicle 20 in which the fuel efficiency difference in the vehicle 20 increases.

For example, as illustrated in FIG. 3, the control unit 13 specifies a setting condition. In FIG. 3, the setting condition is specified for each setting region of "aaa" and "bbb". In the setting area with "aaa", the condition A is specified as a setting condition for increasing the fuel efficiency difference. In the condition A, the ambient temperature range from the temperature Ta1 to the temperature Ta2 is specified as the environmental condition of the vehicle 20. In the condition A, a vehicle speed range from the speed Ra1 to the speed Ra2 is specified as the traveling condition of the vehicle 20. In the setting area with "bbb", the condition B is specified as a setting condition for increasing the fuel efficiency difference. In the condition B, the ambient temperature range from the temperature Tb1 to the temperature Tb2 is specified as the environmental condition of the vehicle 20. In the condition B, the vehicle speed range from the speed Rb1 to the speed Rb2 is specified as the traveling condition of the vehicle 20.

In S4 process, the control unit 13 may specify the setting condition for each vehicle type of the vehicle 20. The structure and the like of the engine differ depending on the vehicle type of the vehicle 20. Therefore, by specifying the setting condition for each vehicle type of the vehicle 20, it is possible to accurately specify the setting condition for improving the fuel efficiency of the vehicle 20 by use of the low-viscosity oil.

After the processing of S4, the processing of S5 and S6 is executed. Processing of S5 and S6 may be performed by in-vehicle device 30 of any vehicle 20 of the plurality of vehicles 20 included in the system 1. The in-vehicle device 30 performs S5 and S6 processes the same as or similar to S1 and S2 processes.

In S7 process, in the server device 10, the control unit 13 receives data of the vehicle 20 from the plurality of vehicles 20 via the network 2 by the communication unit 11.

In S8 process, the control unit 13 refers to the type of the engine oil in the storage unit 12, and identifies the vehicle 20 that does not use the low-viscosity oil among the plurality of vehicles 20 that have received the data in S7 process. Hereinafter, the vehicle 20 that does not use the specified low-viscosity oil is also referred to as "vehicle 20A". The control unit 13 executes a notification process when 20A of vehicles received in the process of S7 satisfies the setting condition. In the present embodiment, the control unit 13 executes the notification process when the environmental data and the traveling data of the vehicle 20A satisfy the setting condition.

For example, it is assumed that the control unit 13 specifies that the set area in which the vehicle 20A travels is "aaa" as illustrated in FIG. 3, based on the time-series data of the position of the vehicle 20 included in the travel data of the vehicle 20A. Further, it is assumed that the vehicle speed included in the traveling data of the vehicle 20A is in the range from the velocity Ra1 to Ra2, and the outside air temperature included in the environmental data of the vehicle 20A is in the range from the temperature Ta1 to Ta2. In this case, the control unit 13 determines that the environmental data and the traveling data of the vehicle 20A satisfy the condition A as illustrated in FIG. 3.

As an example of the notification process, the control unit 13 may transmit a notification recommending the use of the low-viscosity oil to the terminal device of the user of the vehicle 20A via the network 2 by the communication unit 11. The terminal device of the user of the vehicle 20A may be a smart phone or an in-vehicle device 30 mounted on the vehicle 20A. The terminal device of the user of the vehicle 20A may cause the terminal device to display the received notification when receiving the notification recommending the use of the low-viscosity oil from the server device 10. For example, when the terminal device of the user of the vehicle 20A is the in-vehicle device 30, the control unit 35 causes the display of the output unit 33 to display a notification recommending the use of the low-viscosity oil. By executing such a notification process, it is possible to recommend the use of low-viscosity oil to the user of the vehicle 20A. Also, the user of the vehicle 20A may not know the presence of low-viscosity oil. In this case, the user of the vehicle 20A can be notified of the presence of the low-viscosity oil by executing the notification process. Here, the control unit 13 may transmit, to the terminal device of the user of the vehicle 20A, the notification that recommends the use of the low viscosity oil and the information indicating the use effectiveness of the low viscosity oil. The information indicating the use effectiveness of the low viscosity oil is, for example, information indicating the degree of improvement in fuel efficiency of the vehicle 20A due to the use of the low viscosity oil. In this case, the control unit 13 acquires the environmental data of the vehicle 20A and the data similar to the traveling data received in S7 processing from the traveling data and the environmental data accumulated in the storage unit 12 by the processing of S3 from S1. The control unit 13 generates information indicating the use effect of the low-viscosity oil by calculating the fuel consumption difference in the vehicle 20 based on the obtained traveling data and environmental data. When the information indicating the use effectiveness of the low viscosity oil is transmitted to the terminal device of the user of the vehicle 20A together with the notification, the use of the low viscosity oil can be strongly recommended to the user of the vehicle 20A.

As another example of the notification process, the control unit 13 may transmit the information of the user of the vehicle 20A to the terminal device of the dealer of the engine oil by the communication unit 11. With such a configuration, it is possible to recommend the use of low-viscosity oil to the user of the vehicle 20A via the vendor of the engine oil. The control unit 13 may transmit information indicating the use effect of the low-viscosity oil together with the notification to the terminal device of the dealer of the engine oil.

Here, in S8 process, the control unit 13 may not execute the notification process even when the environmental data and the travel data of the vehicle 20A satisfy the setting condition, or when the travel data of the vehicle 20A received in S7 process satisfies the condition that causes the engine degradation. The condition causing the engine deterioration may be a condition that the number of times of travel of the trip time exceeding the predetermined time exceeds the predetermined number of times, or a condition that the traveling frequency at the vehicle speed exceeding the predetermined speed exceeds the predetermined frequency. The predetermined time, the predetermined number of times, the predetermined speed, and the predetermined frequency may be set in consideration of engine deterioration. In this way, the vehicle 20 can be protected by not executing the notification process when the traveling data of the vehicle 20A satisfies the condition that causes the engine degradation.

In this way, in the server device 10, the control unit 13 specifies, for each set area, a setting condition under which the fuel efficiency of the vehicle 20 is improved by using the low-viscosity oil. The control unit 13 executes the notification process when the data of the vehicle 20 that does not use the low-viscosity oil satisfies the setting condition in the setting area. As described above, the degree of improvement in the fuel efficiency of the vehicle 20 due to the use of the low viscosity oil varies from region to region. In the present embodiment, since the setting conditions for improving the fuel efficiency of the vehicle 20 are specified for each setting area, it is possible to more accurately recommend the use of the low-viscosity oil to the user of the vehicle 20 who does not use the low-viscosity oil in the setting area.

Although the present disclosure has been described above based on the drawings and the embodiments, it should be noted that those skilled in the art may make various modifications and alterations thereto based on the present disclosure. It should be noted, therefore, that these modifications and alterations are within the scope of the present disclosure. For example, the functions included in the configurations, steps, etc. can be rearranged so as not to be logically inconsistent, and a plurality of configurations, steps, etc. can be combined into one or divided.

For example, in the above-described embodiment, the server device 10 as the information processing device specifies, for each set area, a setting condition for improving the fuel efficiency of the vehicle by using the low-viscosity oil based on the data of the plurality of vehicles 20. In the above description, the server device 10 executes the notification process when the data of the vehicle 20 that does not use the low-viscosity oil satisfies the setting condition in the setting area. However, an arbitrary information processing device may specify such a setting condition and execute a notification process.

What is claimed is:

1. An information processing device comprising a control unit that specifies a setting condition for improving fuel efficiency of a vehicle by using low-viscosity oil based on data on a plurality of vehicles for each setting area set in advance, wherein the control unit is configured to execute a notification process to recommend a user of a vehicle in which the low-viscosity oil is not used to use the low-viscosity oil when data on vehicles in which the low-viscosity oil is not used meet the setting condition in the setting area.

2. The information processing device according to claim 1, wherein the control unit is configured to:
calculate a fuel consumption difference by subtracting fuel consumption of the vehicle for a case where high-viscosity oil is used from fuel consumption of the vehicle for a case where the low-viscosity oil is used, and specify the setting condition by specifying an environment condition and a travel condition for the vehicle under which the fuel consumption difference is large; and
execute the notification process when environment data and travel data on the vehicle in which the low-viscosity oil is not used meet the setting condition.

3. The information processing device according to claim 1, wherein the control unit is configured not to execute the notification processing when travel data on the vehicle in which the low-viscosity oil is not used meet a condition under which engine deterioration is caused, even when environment data and travel data on the vehicle in which the low-viscosity oil is not used meet the setting condition.

4. The information processing device according to claim 1, further comprising a communication unit, wherein the control unit transmits a notification that recommends use of the low-viscosity oil to a terminal device of the user of the vehicle in which the low-viscosity oil is not used using the communication unit in the notification process.

5. The information processing device according to claim 1, further comprising a communication unit, wherein the control unit transmits information on the user of the vehicle in which the low-viscosity oil is not used to a terminal device of an engine oil dealer using the communication unit in the notification process.

* * * * *